US009766936B2

(12) United States Patent
Beckmann et al.

(10) Patent No.: US 9,766,936 B2
(45) Date of Patent: *Sep. 19, 2017

(54) SELECTING A RESOURCE FROM A SET OF RESOURCES FOR PERFORMING AN OPERATION

(71) Applicant: Advanced Micro Devices, Inc., Sunnyvale, CA (US)

(72) Inventors: Bradford M. Beckmann, Redmond, WA (US); Mithuna S. Thottethodi, Bellevue, WA (US); James M. O'Connor, Austin, TX (US); Mauricio Breternitz, Austin, TX (US); Lisa R. Hsu, Kirkland, WA (US); Gabriel H. Loh, Bellevue, WA (US); Yasuko Eckert, Kirkland, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,056

(22) Filed: Nov. 6, 2015

(65) Prior Publication Data

US 2016/0062803 A1    Mar. 3, 2016

Related U.S. Application Data

(63) Continuation of application No. 13/761,985, filed on Feb. 7, 2013, now Pat. No. 9,183,055.

(51) Int. Cl.
*G06F 9/50* (2006.01)
*G06F 12/0875* (2016.01)

(52) U.S. Cl.
CPC .......... *G06F 9/5016* (2013.01); *G06F 9/5011* (2013.01); *G06F 12/0875* (2013.01); *G06F 2212/45* (2013.01)

(58) Field of Classification Search
CPC ...................................... G06F 9/5016
See application file for complete search history.

(56) References Cited

U.S. PATENT DOCUMENTS

2008/0072000 A1\*  3/2008  Osaki ................. G06F 11/1662
                                                                    711/162
2008/0301400 A1\* 12/2008  Gassmann .......... G06F 12/0207
                                                                    711/220

(Continued)

OTHER PUBLICATIONS

Dave Mount, CMSC 420: Data Structures, 2001.\*

(Continued)

*Primary Examiner* — Charlie Sun
(74) *Attorney, Agent, or Firm* — Park, Vaughan, Fleming & Dowler LLP

(57) ABSTRACT

The described embodiments comprise a selection mechanism that selects a resource from a set of resources in a computing device for performing an operation. In some embodiments, the selection mechanism performs a lookup in a table selected from a set of tables to identify a resource from the set of resources. When the resource is not available for performing the operation and until another resource is selected for performing the operation, the selection mechanism identifies a next resource in the table and selects the next resource for performing the operation when the next resource is available for performing the operation.

20 Claims, 4 Drawing Sheets

(56) References Cited

U.S. PATENT DOCUMENTS

2010/0211745 A1* 8/2010 Jeddeloh .............. G06F 1/3203
711/137
2014/0052914 A1* 2/2014 Wang .................. G06F 12/0846
711/119

OTHER PUBLICATIONS

S. Nite, Introduction to Truth Tables, 2012.*
T. Kleinpeter, "Programmer's Toolbox Part 3: Consistent Hashing," accessed on the Internet at http://www.tomkleinpeter.com/200S/03/17 /programmers-toolbox-part-3-consistenthashing/, last accessed Mar. 3, 2016.
D. Henry et al., "Circuits for Wide-Window Superscalar Processors," ISCA '00 Proceedings of the 27th annual international symposium on Computer architecture, pp. 236-247.

* cited by examiner

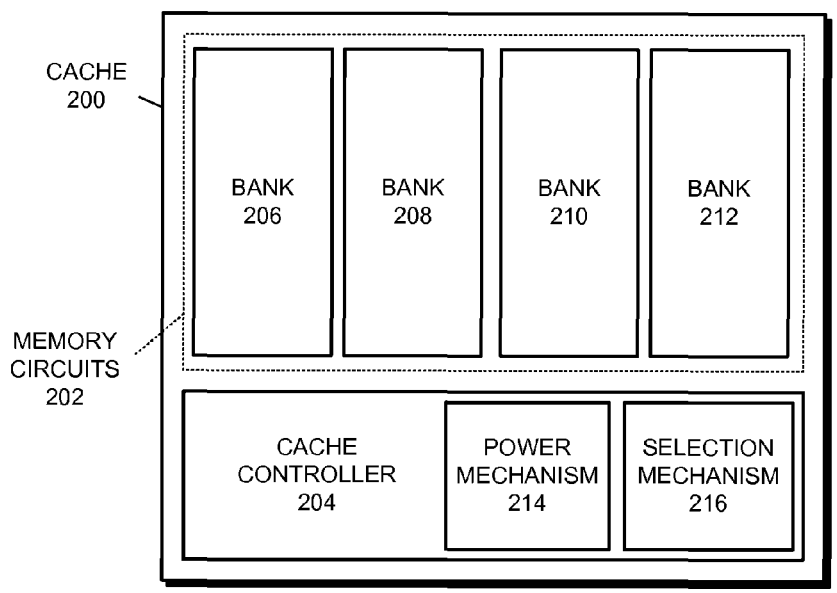
FIG. 2
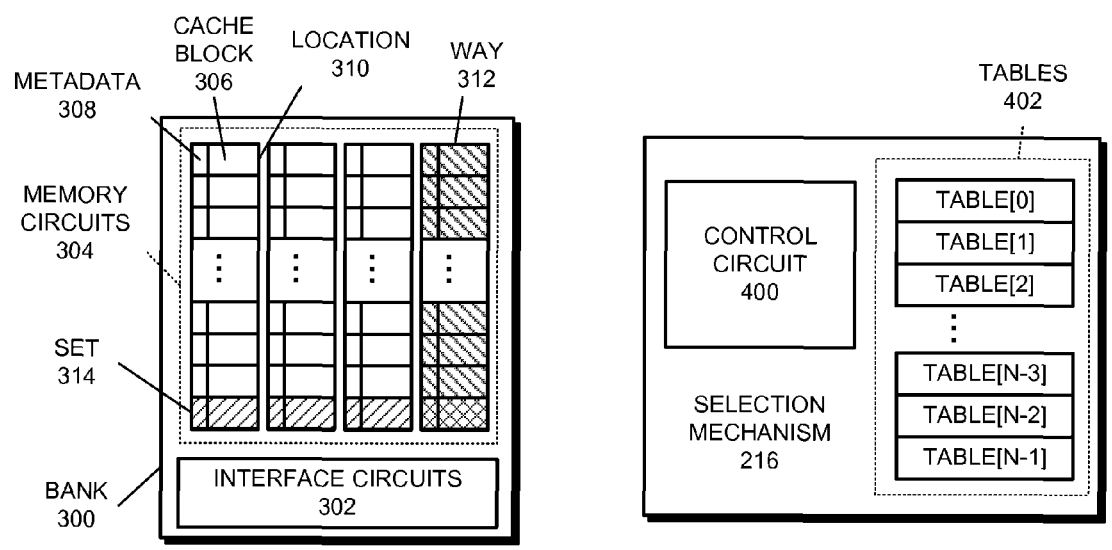
FIG. 3
FIG. 4

SELECTING A RESOURCE FROM A SET OF RESOURCES FOR PERFORMING AN OPERATION

RELATED APPLICATIONS

The instant application is a continuation of pending U.S. patent application Ser. No. 13/761,985, which was filed on 7 Feb. 2013, and which is incorporated by reference.

BACKGROUND

Field

The described embodiments relate to handling resources in computing devices. More specifically, the described embodiments relate to selecting a resource from a set of resources for performing an operation in a computing device.

Related Art

Many modern computing devices include subsystems with multiple resources for performing corresponding operations. For example, these computing devices can include multiple processor cores (resources) for executing threads (an operation), multiple banks in a cache that can be used for storing cache blocks, mass-storage devices such as disks and semiconductor memories for storing data, etc. In some cases, these resources can become unavailable during operation of the computing device. For example, one or more of the banks in the cache, processor cores, and/or network interfaces can be powered-down to conserve power. Existing techniques for selecting resources for performing operations in the computing device after one or more resources have become unavailable and/or available are complex and/or can lead to poorly balanced resource usage.

SUMMARY

The described embodiments comprise a selection mechanism that selects a resource from a set of resources in a computing device for performing an operation. For example, in some embodiments, the selection mechanism can select a bank in a cache (the resource) from a set of banks in the cache for storing a cache block (the operation) or can select a processor from among a set of processors for executing a thread. In some embodiments, a control circuit in a selection mechanism selects a table from a set of tables, each table in the set of tables comprising a listing of the resources in the set of resources in a different order. The control circuit then performs a lookup in the table to identify a resource from the set of resources. When the resource is not available for performing the operation, and until another resource is selected for performing the operation, the control circuit identifies a next resource based on the table and selects the next resource for performing the operation when the next resource is available for performing the operation.

In some embodiments, selecting the table from the set of tables comprises selecting the table so that the operation and one or more additional operations are distributed for performing in a predetermined pattern among the resources in the set of resources.

In some embodiments, the control circuit selects the resource for performing the operation when the resource is available for performing the operation.

In some embodiments, identifying the next resource based on the table comprises acquiring information identifying the next resource when performing the lookup in the table to identify the resource, so that one lookup is performed for both identifying the resource and acquiring the information identifying the next resource.

In some embodiments, the control circuit makes a rotation adjustment to the table before performing the lookup in the table.

In some embodiments, the control circuit determines a table count to be used when subsequently generating the tables for the set of tables, the table count equal to a number of tables to be generated for the set of tables. The control circuit then generates the tables in the set of tables based at least in part on the table count, each table comprising a listing of the resources from the set of resources in a different order. In some embodiments, determining the table count is based at least in part on a number of permutations for the listings of the resources.

In some embodiments, the set of resources comprises a set of banks in a cache and the operation to be performed comprises storing a cache block to a selected bank in the cache.

Some embodiments comprise a circuit with two or more stages coupled in ring configuration. In these embodiments, the circuit comprises a ready input and index input to each stage and a result output from each stage. In these embodiments, the circuit is configured to assert a result output from one of the stages based on values on the ready input and index input to at least one of the stages. In some embodiments, a resource for performing the operation is selected based on the asserted result output.

BRIEF DESCRIPTION OF THE FIGURES

FIG. 2 presents a block diagram illustrating a cache in accordance with some embodiments.

FIG. 3 presents a block diagram illustrating a bank in accordance with some embodiments.

FIG. 4 presents a block diagram illustrating selection mechanism in accordance with some embodiments.

Throughout the figures and the description, like reference numerals refer to the same figure elements.

DETAILED DESCRIPTION

Figure 1:
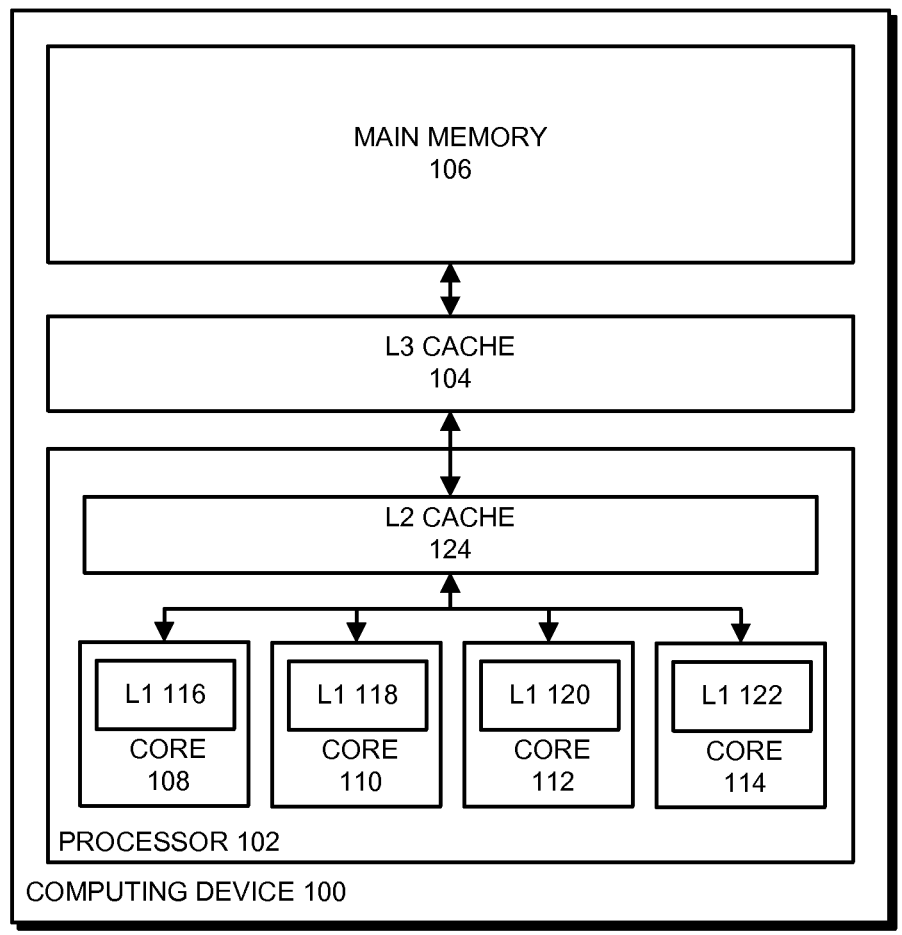
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., computing device 100 in FIG. 1) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, graphics processors (GPUs)/graphics processor cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., some or all of computing device 100 (see FIG. 1), cache controller 204 (see FIG. 2), selection mechanism 216, etc. and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In the following description, functional blocks may be referred to in describing some embodiments. Generally, functional blocks include one or more interrelated circuits that perform the described operations. In some embodiments, the circuits in a functional block include circuits that execute program code (e.g., machine code, firmware, etc.) to perform the described operations.

Overview

The described embodiments include a selection mechanism that selects a resource from a set of resources in a computing device for performing an operation. Generally, the operation can comprise any operation (or combination of operations) that can be performed by one of two or more different resources in the computing device. For example, in some embodiments, the operation is storing a cache block in a cache in the computing device, and the resources are banks in the cache. For this example, the selection mechanism can perform one or more operations for selecting a bank in the cache into which the cache block is to be stored. As another example, in some embodiments, the operation is executing one or more threads, and the resources are processors (or portions thereof) in the computing device. For this example, the selection mechanism can perform one or more operations for selecting a processor for executing the threads.

In some embodiments, the selection mechanism uses a hierarchical selection operation to select the resource for performing the operation. For example, in some embodiments, the selection mechanism maintains a set of tables, each table including a list of the resources from the set of resources in a corresponding order. In these embodiments, the hierarchical selection operation comprises a first selection of a table from the set of tables, and a second selection of a location in the selected table, the location containing an indication of a resource. In these embodiments, when the resource indicated in the location in the table is available for performing the operation (e.g., when the cache bank is available for storing cache blocks, etc.), the resource is used for performing the operation. Otherwise, if the resource is not available for performing the operation, the selection mechanism steps through the table, checking next resources until an available resource in the selected table is found and selected for performing the operation. For example, in some embodiments, starting from a next closest entry in the table (with a wrap from a last location in the table to a first location in the table), the selection mechanism can check each next entry until an available entry is found.

In some embodiments, resources are selected for performing two or more operations, and the above-described selection mechanism selects resources in such a way that the operations are balanced among the set of resources. For example, in some embodiments, when selecting a table, the selection mechanism is configured to select a current table based on the table that was selected in one or more other selection operations (when such operations have occurred). In this way, the selection mechanism makes a balanced selection of the tables over a given number of selection operations. In these embodiments, the operations will therefore be performed by a balanced set of the resources (e.g., will be performed substantially equally across and available set of resources).

In some embodiments, the resources may be dynamically (e.g., at runtime) removed from availability and/or made/remade available. In these embodiments, the selection mechanism selects an available one of the resources for performing the operation as described above. For example, and continuing the cache bank example from above, one or more of the cache blocks may be powered down to conserve electrical power in the computing device. In these embodiments, the selection mechanism selects an available cache bank in which the cache block is to be stored.

In some embodiments, the selection mechanism uses a dedicated circuit for performing some or all of the selection operation. In these embodiments, the circuit, which includes a number of stages configured in a ring, accepts as inputs to each stage an index signal, a ready signal, and a result output from a prior stage, and outputs a result signal for the stage. Based on the states of the ready signal, the index signal, and the result signal from the prior stage, internal logic in each stage is configured to assert the result signal when a resource represented by the stage is to be used to perform the operation (or deassert the result signal when the resource represented by the stage is not to be used to perform the operation).

The described embodiments enable the balanced selection of resources for performing operations in the computing device, which may help to avoid resources being overused (relative to other, idler resources) and/or underused, which can lead to better overall performance of the computing device. These embodiments maintain the balanced use of resources even where resources are dynamically rendered available (e.g., powered up, enabled, etc.) or unavailable (e.g., powered down, disabled, etc.). In using the hierarchical selection operation, these embodiments perform the selection operation using less complex and physically smaller circuits/hardware structures (e.g., memories for storing the tables, etc.), which means that the selection mechanism can be located closer to the resources and/or in areas of the computing device where layout space (e.g., on a semiconductor die) is constrained.

Computing Device

FIG. 1 presents a block diagram illustrating a computing device 100 in accordance with some embodiments. As can be seen in FIG. 1, computing device 100 includes processor 102, L3 cache 104, and main memory 106. Processor 102 is generally a device that performs computational operations in computing device 100. Processor 102 includes four processor cores 108-114, each of which includes a computational mechanism such as a central processing unit (CPU), a graphics processing unit (GPU), and/or an embedded processor.

Processor 102 also includes cache memories (or "caches") that can be used for storing instructions and data that are used by processor cores 108-114 for performing computational operations. As can be seen in FIG. 1, the caches in processor 102 include a level-one (L1) cache 116-122 (e.g., "L1 116") in each processor core 108-114 that is used for storing instructions and data for use by the processor core. Generally, L1 caches 116-122 are the smallest of a set of caches in computing device 100 (e.g., 96 kilobytes (KB) in size) and are located closest to the circuits (e.g., execution units, instruction fetch units, etc.) in the processor cores 108-114 that use the instructions and data that are stored in the L1 caches 116-122. The closeness of the L1 caches 116-122 to the corresponding circuits enables the fastest access to the instructions and data stored in the L1 caches 116-122 from among the caches in computing device 100.

Processor 102 also includes a level-two (L2) cache 124 that is shared by processor cores 108-114 and hence is used for storing instructions and data for all of the sharing processor cores 108-114. Generally, L2 cache 124 is larger than the L1 caches 116-122 (e.g., 2048 KB in size) and is located outside, but close to, processor cores 108-114 on the same semiconductor die as the processor cores 108-114. Because L2 cache 124 is located outside the processor cores 108-114 but on the same die, access to the instructions and data stored in L2 cache 124 is slower than accesses to the L1 caches, but faster than accesses to L3 cache 104 in computing device 100.

Returning to computing device 100, the largest of the caches in computing device 100 (at e.g., 16 MB in size), level-three (L3) cache 104 is shared by the processor cores 108-114 and hence is used for storing instructions and data for all of the processor cores. In some embodiments, L3 cache 104 is located external to processor 102 (e.g., on a different die or dies than processor 102), or is located on a same die as processor 102, but separate from processor 102; accordingly, accessing data and instructions in L3 cache 104 is typically slower than accessing data and instructions in the lower-level caches.

In some embodiments, each of L1 caches 116-122, L2 cache 124, and L3 cache 104 (collectively, "the caches") include memory circuits that are used for storing cached data and instructions. For example, the caches can include one or more of static random access memory (SRAM), embedded dynamic random access memory (eDRAM), DRAM, double data rate synchronous DRAM (DDR SDRAM), and/or other types of memory circuits.

Main memory 106 comprises memory circuits that form a "main memory" of computing device 100. Main memory 106 is used for storing instructions and data for use by the processor cores 108-114 on processor 102. In some embodiments, main memory 106 is fabricated from memory circuits such as one or more of DRAM, SRAM, DDR SDRAM, and/or other types of memory circuits.

Taken together, L1 caches 116-122, L2 cache 124, L3 cache 104, and main memory 106 form a "memory hierarchy" in and for computing device 100. Each of the caches and main memory 106 are regarded as levels of the memory hierarchy, with the lower levels including the larger caches and main memory 106. Within computing device 100, memory requests are preferentially handled in the level of the memory hierarchy that results in the fastest and/or most efficient operation of computing device 100.

Although an embodiment is described with a particular arrangement of processor cores, some embodiments include a different number and/or arrangement of processor cores. For example, some embodiments have only one processor core (in which case the caches are used by the single processor core), while other embodiments have two, six, eight, or another number of processor cores—with the cache hierarchy adjusted accordingly. Generally, the described embodiments can use any arrangement of processor cores that can perform the operations herein described.

Additionally, although an embodiment is described with a particular arrangement of caches, some embodiments include a different number and/or arrangement of caches. For example, the caches (e.g., L1 caches 116-122, etc.) can be divided into separate instruction and data caches. Additionally, L2 cache 124 and or L3 cache 104 may not be shared in the same way as shown, and hence may only be used by a single processor core, two processor cores, etc. (and hence there may be multiple L2 caches 124 and/or L3 caches 104 in processor 102). As another example, some embodiments include different levels of caches, from only one level of cache to multiple levels of caches, and these caches can be located in processor 102 and/or external to processor 102. Generally, the described embodiments can use any arrangement of caches that can perform the operations herein described.

Moreover, although computing device 100 and processor 102 are simplified for illustrative purposes, in some embodiments, computing device 100 and/or processor 102 include additional mechanisms for performing the operations herein described and other operations. For example, computing device 100 and/or processor 102 can include power controllers, mass-storage devices such as disk drives or large semiconductor memories (as part of the memory hierarchy), batteries, media processors, input-output mechanisms, communication mechanisms, networking mechanisms, display mechanisms, etc.

Cache

FIG. 2 presents a block diagram illustrating a cache 200 in accordance with some embodiments. Cache 200 is a general example of an internal configuration that may be implemented in any of the caches in the described embodiments. For example, some or all of L1 caches 116-122, L2 cache 124, and L3 cache 104 can have, but are not required to have, internal configurations similar to cache 200.

As can be seen in FIG. 2, cache 200 includes memory circuits 202 and cache controller 204. Cache controller 204 is a functional block that performs various functions for controlling operations in cache 200. For example, cache controller 204 can manage storing cache blocks to, invalidating cache blocks in, and evicting cache blocks from cache 200; can perform lookups for cache blocks in cache 200; can handle coherency operations for cache 200; and/or can respond to requests for cache blocks from cache 200.

Memory circuits 202 (interchangeably called "memory" in cache 200) include one or more of SRAM, eDRAM, DRAM, DDR SDRAM, and/or other types of memory circuits. In some embodiments, memory circuits 202 are divided into a number of banks 206-212, each of which includes a corresponding portion of memory circuits 202 in cache 200 (and may be described herein as banks 0-3). In some embodiments, each bank is configured to store cache blocks from a corresponding portion of main memory 106. For example, in some embodiments, the address space of main memory 106 is divided into a number of regions (e.g., using a lowest N bits of the address space in main memory) and each bank is used to store cache lines from the region. For instance, given N banks, cache lines from addresses 0, N, 2N, etc. may be stored in bank 0, cache lines from addresses 1, N+1, 2N+1, etc. may be stored in bank 1, cache lines from addresses 2, N+2, 2N+2, etc. may be stored in bank 2, and so on.

FIG. 3 presents a block diagram illustrating an example bank 300 in accordance with some embodiments. Bank 300 is presented as an example of an internal arrangement that may be used in some or all of banks 206-212, however, some embodiments use a different internal arrangement. Generally, the described embodiments can use any internal arrangement of banks 206-212 that can perform the described operations.

As can be seen in FIG. 3, bank 300 includes interface circuits 302 and memory circuits 304. Interface circuits 302 include circuits for operating memory circuits 304 and bank 300, such as read/write circuits for reading cache blocks from and writing cache blocks to memory circuits 304, lookup circuits for performing lookups to determine if memory circuits 304 contain particular cache blocks, control circuits, etc.

Memory circuits 304, which comprise the portion of memory circuits 202 assigned to bank 300, are divided into a set of locations, each location configured to store a cache block and metadata that includes information about the cache block (tags, indicators, flags, etc.). A cache block 306 and corresponding metadata 308 are labeled for example location 310 in bank 300. In some embodiments, each cache block comprises a cache line (although some embodiments can use different-sized cache blocks). Note that, although shown in a same "location" in bank 300, in some embodiments, the metadata and the cache block for each "location" are stored in two physically separate tables/arrays/memory circuits (e.g., a metadata array and a cache block array), which may be in separate banks (e.g., a bank that stores metadata and a bank that stores cache blocks) in cache 200.

As described above, the memory in the caches in computing device 100 is limited (e.g., to 96 KB for L1 caches 116-122, 2048 KB for L2 cache 124, etc.), and so every cache block that may be loaded from main memory 106 cannot be simultaneously stored in a given cache. Instead, locations in the caches are shared, and therefore made available for storing cache blocks from various addresses in memory. In the described embodiments, any of a number of operations/policies can be used for managing the storage of cache blocks in the limited memory in the caches. For example, some embodiments use "set associativity" for managing the storage of cache blocks. For set associativity, the memory in the cache is divided into a number of sets, each of which is assigned to a corresponding bank. The banks are further divided into a number of ways. As can be seen in FIG. 3, bank 300 includes four ways, with an example way 312 indicated by left-leaning hash marks in the rightmost of the four ways in bank 300. In an example embodiment where the memory in bank 300 is 512 KB in size and 1 KB cache blocks are to be stored in bank 300, each way has storage for 128 cache blocks, and hence each way includes 128 sets (with ellipses representing sets not shown in FIG. 3). Each of the sets has a location in each way, with an example set 314 indicated by right-leaning hash marks in the bottommost location in each of the four ways in bank 300. Each set is used to store cache blocks from a range of memory addresses, and hence the corresponding location in each way for the set can be used to store cache blocks from the range of memory addresses.

In embodiments that use set associativity, upon receiving a cache block to be stored in cache 200 (e.g., from a processor core or a lower level in the memory hierarchy), cache controller 204 determines the set in which the received cache block is to be stored. For example, in some embodiments, cache controller 204 compute the set using a hash function for which the input is some or all of the address for the cache block. Cache controller 204 then determines if a location in bank in which the set is stored can be used for storing the received cache block without replacing a cache block presently stored in that location (i.e., when there is an available/open location in the set). When a location in the bank in which the set is stored is available, cache controller 204 stores the cache block into the location.

However, when cache controller 204 determines that there is no location in the bank in which the set is stored that can be used without replacing a cache block presently stored in that location, cache controller 204 determines a cache block that is to be replaced from among the locations for the set in the bank. In other words, when each location in a given set is presently use for storing a cache block, in order to store a new cache block in the set, the cache block in one of the locations in the bank should be evicted from cache 200 (e.g., written to a lower level of cache or to memory and/or overwritten) to make space for the cache block. When determining the cache block that is to be replaced, cache controller 204 can adhere to a replacement policy, which is generally an algorithm or set of rules used to determine the cache block that is to be evicted. In some embodiments, the replacement policy can be a first-in-first out policy, in which the first cache block to be stored in a set is evicted, a least-recently-used policy, in which the least recently accessed location in the set is evicted, and/or another replacement policy. After evicting the cache block from the determined location in the bank, cache controller 204 can store the received cache block in the location in the bank.

In some embodiments, cache controller 204 also includes power mechanism 214. Power mechanism 214 includes circuits for configuring a power mode of banks 206-212. For example, in some embodiments, power mechanism 214 can configure one or more of banks 206-212 in a lower-power operating mode in which the bank is "powered-down" and thus is not available for storing cache blocks. In the lower-power operating mode, a voltage of a power signal for the bank may be reduced, one or more control signals (e.g., clocks, refresh signals, etc.) to the bank may be slowed or halted, and/or other adjustments to the operating mode of the bank may be made. In these embodiments, power mechanism 214 can configure one or more of banks 206-212 in a higher-power operating mode in which the bank is "powered-up" and thus is available for storing cache blocks. In the higher-power operating mode, a voltage of a power signal for the bank may be increased (particularly relative to the lower-power operating mode), one or more control signals (e.g., clocks, refresh signals, etc.) to the bank may be sped up or supplied normally, and/or other adjustments to the operating mode of the bank may be made. Note that, in some embodiments, some or all of banks 206-212 can be made unavailable for storing cache blocks in ways other than being placed in the lower-power mode. For example, cache controller 204 can configure one or more of banks 206-212 in a locked or busy mode, in which the bank may be fully or partially powered-up, but may be rendered unable to store new data in the bank.

Cache controller 204 also includes selection mechanism 216. Upon receiving a cache block to be stored in cache 200, selection mechanism 216 performs a selection operation to select a bank from banks 206-212 into which the cache block is to be stored. During the selection operation, selection mechanism 216 initially identifies a given bank (e.g., using information from the cache block to be stored) as the bank to which the cache block is to be stored. In some embodiments, the initially-identified bank is the bank into which the cache block is preferentially stored in cache 200, e.g., is a "home" bank for the cache block. When the initially-identified bank is available (e.g., is powered up and otherwise available for storing cache lines) selection mechanism 216 causes cache controller 204 to store the cache block in the bank. However, when the initially-identified bank is unavailable (e.g., is powered-down or otherwise unavailable), selection mechanism 216 "fails over" and determines another bank that is available for storing the cache block. When failing over (during a failover operation), selection mechanism 216 is configured to check the banks in a corresponding order to find an available bank. Generally, the order in which the banks are checked is configured so that, among multiple selection operations, the failover bank is selected in a balanced way from among the banks in cache 200. In other words, given multiple separate instances of failover, each of the other banks (or at least a subset of the other banks) has an approximately equal chance of being identified as the bank to which a corresponding cache block is to be written. In this way, upon failover, the banks in cache 200 are stored to approximately equally, leading to more efficient use of the banks in cache 200 and improved overall performance (in contrast to using techniques such as random bank assignments, sequential failover, etc.). Selection mechanism 216 and the selection operation are described in more detail below.

Although cache 200 is described using four banks (i.e., banks 206-212), in some embodiments, cache 200 includes a different number of banks. For example, cache can include 5, 16, or another number of banks Generally, the described embodiments can include any number of banks in cache 200 that enable the operations herein described. In addition, although bank 300 is described a particular number of ways, some embodiments include different numbers of ways. For example, bank 300 can include 7, 16, or another number of ways. Generally, the described embodiments can include any number of ways in bank 300 that enable the operations herein described. Moreover, although some embodiments are described using set associativity, other embodiments use different types of associativity and/or different management policies for cache 200/bank 300. For example, some embodiments use skewed associativity, full associativity, etc.

Although power mechanism 214 and selection mechanism 216 are shown in cache controller 204, in some embodiments, power mechanism 214 and selection mechanism 216 are located elsewhere in computing device 100. For example, selection mechanism 216 can be incorporated into a memory controller (not shown) in computing device 100. Generally, power mechanism 214 and selection mechanism 216 can be located anywhere in computing device 100 where power mechanism 214 and selection mechanism 216 can perform the operations herein described.

Selection Mechanism

FIG. 4 presents a block diagram illustrating selection mechanism 216 in accordance with some embodiments. As described above, upon receiving a cache block to be stored in cache 200, selection mechanism 216 is configured to perform a selection operation to select a bank in cache 200 into which the cache block is to be stored.

Selection mechanism 216 includes control circuit 400 and tables 402. Control circuit 400 includes circuits, functional blocks, etc. configured to perform operations for controlling the operation of selection mechanism 216, including performing the selection operation, maintaining tables 402-414, and other operations.

Tables 402 include a set of M tables, each of which comprises a listing of banks 206-212 in a corresponding order. In some embodiments, the corresponding order in each table is a different one of the possible permutations of a listing of the resources. Thus, using the four banks in the example, a sample of these listings in each table in tables 402 appears as follows (with some of the M=24 possible permutations not shown, as represented by the ellipsis, and with bank 206 represented by 0, bank 208 represented by 1, etc.):

| | |
|---|---|
| TABLE[0]: | 0123 |
| TABLE[1]: | 1032 |
| TABLE[2]: | 2130 |
| ... | |
| TABLE[M-3]: | 1203 |
| TABLE[M-2]: | 2013 |
| TABLE[M-1]: | 2310 |

When performing the selection operation, control circuit 400 performs a hierarchical operation that includes two sub-operations. In the first of the sub-operations, control circuit 400 uses information from a store operation for the cache block (e.g., an address of the cache block, a source of the store operation, a priority of the source of the store operation, etc.) to select a table from among tables 402. In the second of the sub-operations, control circuit 400 uses the information and the selected table to identify an available bank that is to be selected for storing the cache block. In these embodiments, the second of the sub-operations comprises performing a lookup to initially identify a bank in the cache in a corresponding location in the table. In some embodiments, the initially-identified bank is the bank into which the cache block is preferentially stored in cache 200, e.g., is a "home" bank for the cache block. Control circuit 400 then determines if the initially-identified bank is available for storing the cache block, e.g., is powered-up and otherwise available for storing the cache block. If the initially-identified bank is available, control circuit 400 selects the initially-identified bank in cache 200 for storing the cache block.

When the initially-identified bank is not available (e.g., is powered-down or otherwise unavailable for storing the cache block), control circuit 400 "fails over," and identifies a next bank using the selected table, where an identifier for the next bank is found in a predetermined position in the listing in the table with respect to the initially-identified bank. For example, the identifier for the next bank can be found in a closest table element to the right of the location in the table where the identifier for the initially-identified bank was found, with a wrap to a first element in the table from the last element in the table. In this case, using TABLE[2] above, if initially-identified bank 3 is not available, control circuit 400 can identify bank 0 as the next bank in the table. If the next bank is available, control circuit 400 selects the next bank in cache 200 for storing the cache block.

When the next bank is not available, control circuit 400 continues to fail over and thus proceeds through the table in the same way, checking each identified next bank in the selected table to determine if the bank is available and selecting the next bank if the next bank is available. For example, assuming that only bank 0 is available, and thus banks 1, 2, and 3 are powered-down or are otherwise unavailable, using TABLE[1] above, if initially-identified bank 3 is not available, control circuit 400 checks bank 2 and then bank 1 before determining that bank 0 is available and selecting bank 0 for storing the cache block.

In some embodiments, across multiple selection operations, control circuit 400 is configured to balance the use of banks for storing cache blocks. In these embodiments, balancing the use of banks generally means that, if a given bank is powered-down or is otherwise unavailable for storing cache blocks, the cache blocks that would normally be stored in the unavailable bank are not automatically all stored to a particular failover bank (e.g., if bank 1 is powered-down, all the cache blocks are not automatically stored to failover bank 2). Instead, the use of the banks is balanced by selecting tables (in the first sub-operation) across multiple selection operations so that the banks selected on failover using the table are evenly distributed among the other banks. For example, in some embodiments, during two or more selection operations, the tables are selected in order (TABLE[0], TABLE[1], etc.), selected using weighting (i.e., selecting designated tables first and/or more often), selected using a designated pattern, and/or selected using a pseudo-random selection.

In some embodiments, selection mechanism 216 can perform one or more additional operations during the selection operation. For example, in some embodiments, when a bank is not available, selection mechanism 216 can update tables 402 to remove the bank from the listings in the tables. Thus, if TABLE[0] contains the initial listing, but bank 2 is powered-down, an updated listing may appear as 0103 or as 0133. In some embodiments, the update made to each table is made in view of the balanced use of the banks (as described above). Thus, and continuing the example, all of the tables in tables 402 may not be updated by replacing 2 with 0, but instead may have a corresponding identifier used as a replacement in each table.

In some embodiments, tables 402 include only unique permutations in the tables. In these embodiments, permutations that can be derived from other permutations are not included in tables 402. For example, because a table with listing 0123 can be used (via a rotation operation) to generate tables with listings 3012, 2301, and 1230, tables with the latter three listings may not be included in tables 402. Instead, during the first sub-operation (in which a table is selected), selection mechanism 216 can compute a rotation value or another change value that is used to arrange a given table into a desired configuration. For example, and continuing the example above, a table with a listing of the banks 0123 rotated 2 positions becomes 2301. In these embodiments, during a sequence of two or more selection operations, the rotation value can be selected in order (1, 2, etc.), selected using a pseudo-random selection, or selected using another designated pattern.

In some embodiments, tables 402 includes only a subset of the possible permutations in the tables. In these embodiments, a representative set of permutations may be chosen and used to populate tables 402, instead of the full complement of tables (in these embodiments, the representative set of permutations can include more or less permutations than the unique permutations described above). In some embodiments, the permutations are selected to substantially balance the use of banks 206-212 (e.g., to best balance the use of banks 206-212 given a limited number of tables, etc.). For example, a given number of tables may be determined (e.g., 20, 32, etc.) and a selection pattern may also be determined (e.g., sequential, random, etc.), and a representative set of permutations may be selected to substantially balance the use of banks 206-212. Note that the use of banks 206-212 is "substantially balanced" in that one or more of banks 206-212 may be used more/less frequently than other banks in these embodiments (i.e., the use of the banks may not be perfectly balanced). However, the general approach is to approximately balance the use of the banks given a limited number of tables.

In some embodiments, selection mechanism 216 is configured to read all information from the selected table during the first lookup in the table and store the information, e.g., in a register or memory element. In these embodiments, if the initially-identified bank is not available for storing the cache block, the stored information from the table is used to determine at least one next available bank for storing the cache block. For example, if TABLE[0] is the selected table, selection mechanism 216 can read the information "0123" from the table and store the information in a register for subsequent use in determining a next bank in the table.

In some embodiments, selection mechanism 216 and/or another mechanism in computing device 100 (e.g., an operating system executing on computing device 100) initializes tables 402. For example, in these embodiments, selection mechanism 216 computes a number of tables in the set of tables (or otherwise receive an indication of the number of tables) and generates the tables in the set of tables based at least in part on the number of tables, each table comprising a listing of the resources from the set of resources in a corresponding order (where the corresponding order in each table depends on the number of tables, the number of possible permutations, and/or other factors). In some embodiments, the number of tables is equal to the number of possible permutations, however, some embodiments use a smaller number of tables.

In some embodiments, some or all of tables 402 are implemented in one or more circuit elements (e.g., combinational logic, etc.). In these embodiments, one or more logic gates and/or functional blocks can be used to implement the function(s) performed by tables 402 (so that the outcome of a lookup using tables 402 implemented in the one or more circuit elements is equivalent to the lookup using the above-described tables). In some of these embodiments, control circuit 400 and tables 402 are implemented together in one or more logic gates and/or functional blocks (so that, e.g., the logic gates and/or functional blocks perform the operations of control circuit 400 and tables 402).

Using a Selection Mechanism for Other Resources

Although selection mechanism 216 is described as part of cache 200, and as being used for selecting a cache bank into which a cache block is to be stored, in some embodiments, selection mechanism 216 is used for selecting other type(s) of resources for performing other type(s) of operations. For example, in some embodiments, selection mechanism 216 is used to select processors from among a set of processors for executing threads, mass-storage devices such as disks and semiconductor memories in an array for storing information, etc. Generally, selection mechanism 216 can be used to select any resources from a set of resources to perform an operation, including for sets of resources that may dynamically gain and lose resources (via power-down, business, configuration, etc.). In these embodiments, selection mechanism 216 can be located anywhere in computing device, but performs a selection operation similar to the herein-described selection operation for the corresponding resources.

Selection Circuit

In some embodiments, the above-described selection operation is performed by selection mechanism 216 using a selection circuit. In these embodiments, the selection circuit may replace some or all of the lookup in tables 402. Generally, given an identifier from an operation (e.g., some or all of an address for a cache line to be stored, an instruction identifier, a network communication, etc.) and a set of signals identifying resources that are "ready" or available for performing the operation, the selection circuit generates a result that identifies a resource from a set of resources for performing the operation.

Figure 5:
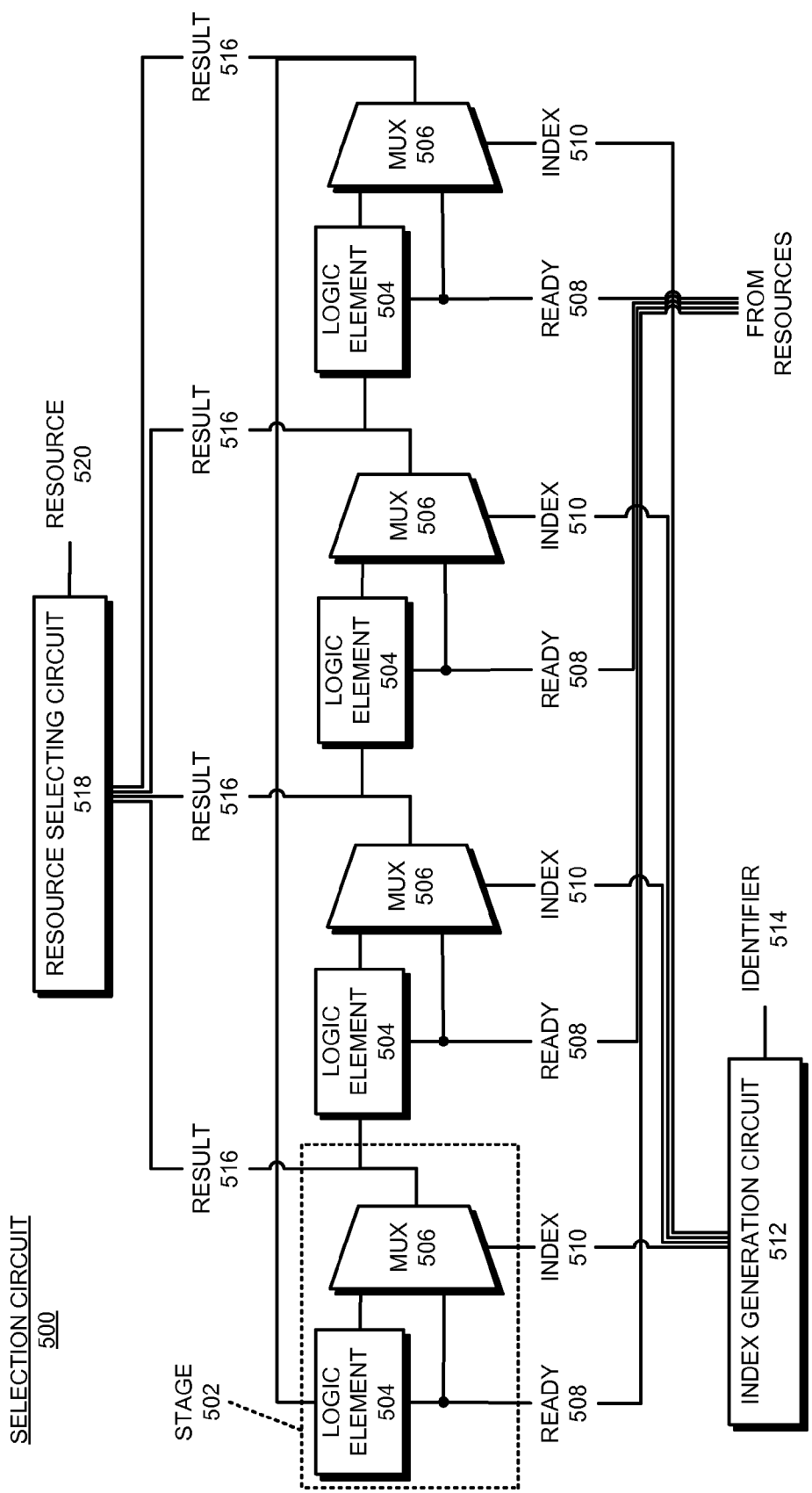
FIG. 5 presents a block diagram illustrating a selection circuit in accordance with some embodiments.

FIG. 5 presents a block diagram illustrating a selection circuit 500 in accordance with some embodiments. In the example shown in FIG. 5, selection circuit 500 is configured for selecting a resource from among four resources. For example, for selecting a bank from among banks 206-212, for selecting a processor core for executing a thread from among a set of four processor cores, etc. Selection circuit 500 comprises four stages (an example stage 502 is labeled) arranged in a ring, each of which comprises a logic element 504 and a multiplexer (MUX) 506. The inputs for each stage include a ready 508 input, which is asserted (e.g., set to a logical 1) when a corresponding resource is available for performing the operation, an index 510 input, a corresponding one of which is asserted by index generation circuit 512 based on identifier 514, and a result 516 input, which is output by a prior stage in selection circuit 500. The output for each stage includes a result 516 output that indicates if a resource associated with the stage is to be used in performing the operation.

Selection circuit 500 includes index generation circuit 512. Index generation circuit 512 comprises one or more circuits or functional blocks that assert an index 510 input to one of the stages based on the identifier 514 input. In some embodiments, the index 510 that is asserted by index generation circuit 512 is associated with the initially-identified resource for performing the operation, and starts the selection operation at a corresponding stage of selection circuit 500. As an example, if the initially-identified resource is the second resource, index generation circuit 512 may assert the index 510 signal to the second stage of selection circuit 500 (e.g., the closest stage to the right of example stage 502). This starts the selection operation at the second resource.

Selection circuit 500 includes resource selecting circuit 518. Resource selecting circuit 518 comprises one or more circuits or functional blocks that identify a resource 520 based on the set of result 516 input signals.

An example of a selection operation using selection circuit 500 is now presented. For this example, it is assumed that each of four resources asserts a ready 508 input to a corresponding stage of selection circuit 500 when the resource is available for performing the operation (e.g., is powered-up and otherwise available). Thus, when the first resource is available, the first resource asserts the ready 508 input to the first stage (example stage 502) of selection circuit 500. It is further assumed that an identifier has been received on the identifier 514 input to index generation circuit 512. In some embodiments, the identifier is a value associated with the operation that is used to determine which of the index 510 signals is to be asserted. For example, if the resources are banks in cache 200 and the operation is storing a cache block in one of the banks, the identifier may be one or more of an address for the cache block, a source of the store operation (e.g., a processor core, lower-level cache, etc.), a priority of the source of the store operation, an operating mode of computing device 100, etc.

The selection operation starts when index generation circuit 512 asserts an index 510 input to a stage of selection circuit 500 based on identifier 514. As described above, the index 510 input asserted by index generation circuit represents the initially-identified resource. For this example, it is assumed that the index 510 input to the second stage in selection circuit 500 is the index 510 input that is asserted, meaning that the second resource is the initially-identified resource. Note that only one of the index 510 inputs is asserted by index generation circuit 512 during a given instance of the selection operation (i.e., the index 510 input is asserted and the selection operation completes based on the asserted index 510 input).

The asserted index 510 input causes the multiplexer 506 in the second stage of selection circuit 500 to place the value on the ready 508 input to the second stage on the result 516 output of the second stage. When the second resource is ready, the ready 508 signal is asserted, and hence the result 516 output of the second stage is asserted. In this case, the second resource, which is the initially-identified resource, is available for performing the operation and is selected for performing the operation by resource selecting circuit 518. Thus, an identifier for the second resource is placed on resource 520 by resource selecting circuit based on the asserted result 516 output from the second stage of selection circuit 500. One or more other circuits (not shown) can then use the resource 520 output of selection circuit to determine the resource that is to be used for performing the operation.

Otherwise, when the second resource is not ready, the ready 508 signal is deasserted, and hence the result 516 output of the second stage is deasserted. In this case, the second resource, which is the initially-identified resource, is not available for performing the operation and therefore is not selected for performing the operation. The deasserted result 516 signal feeds to the logic element of the third stage of selection circuit 500, which also receives the ready 508 input to the third stage. Because the index 510 input to the third stage is deasserted (recall that only the index 510 input to the second stage is asserted for this iteration of the selection operation), the multiplexer 506 in the third stage is configured to place the output of the logic element 504 in the third stage on the result 516 output of the third stage. The output from the logic element 504 in the third stage is asserted when both the result 516 input to the third stage is deasserted and the ready 508 input to the third stage is asserted. For this example, it is assumed that the ready 508 input to the third stage is asserted (and, as described above, the result 516 output from the second stage is deasserted), and hence the result 516 output of the third stage is asserted. In this case, the third resource, which is a next resource (i.e., not the initially-selected resource), is available for performing the operation and is selected for performing the operation by resource selecting circuit 518. Thus, an identifier for the third resource is placed on resource 520 by resource selecting circuit based on the asserted result 516 output from the second stage of selection circuit 500. One or more circuits can then use the resource 520 output of selection circuit to determine the resource that is to be used for performing the operation.

If the third resource had not been ready, the result 516 output of the third stage would have been deasserted, and the fourth stage would have either asserted the result 516 output from the fourth stage (if the forth resource was ready), or deasserted the result 516 output from the fourth stage (if the forth resource was not ready), sending the deasserted result 516 output from the fourth stage to the first stage. In this way, the selection operation proceeds (ripples) through the stages of selection circuit 500 from the stage for which the index 510 input was asserted until a stage is encountered for which the ready 508 signal is asserted and a corresponding resource is selected.

As described above, some embodiments balance the use of resources across multiple selection operations. Thus, in some embodiments, multiple instances of selection circuit 500 can be used, each with a different configuration of resources to stages (e.g., in one selection circuit 500, a first resource can be represented by a first stage, while in a different selection circuit, the first resource can be represented by a third stage, etc.). In these embodiments, selection mechanism 216 first selects an instance of selection circuit 500 and then uses the instance of selection circuit 500 to perform the selection operation, thereby enabling balancing the use of resources across multiple selection operations. As described below, some embodiments use a hierarchy of selection circuits 500 to select resources for performing operations.

Although selection circuit is shown with resource selecting circuit 518 and index generation circuit 512, some embodiments use different arrangements of circuit elements. For example, in some embodiments, the result 516 outputs are used directly to indicate a resource that is to perform an operation (and hence there may be no resource selecting circuit 518). As another example, in some embodiments, the functional blocks that perform the operations of resource selecting circuit 518 and/or index generation circuit 512 can be located elsewhere in computing device 100.

Although selection circuit 500 is described as a single ring structure with a number of stages, in some embodiments, multiple ring structures can be used. For example, in some embodiments, a hierarchy of selection circuits 500, with higher level(s) of the hierarchy indicating which selection circuit is to be used at a lowest level of the hierarchy for selecting a resource for performing the operation.

Processes for Selecting Resources

Figure 6:
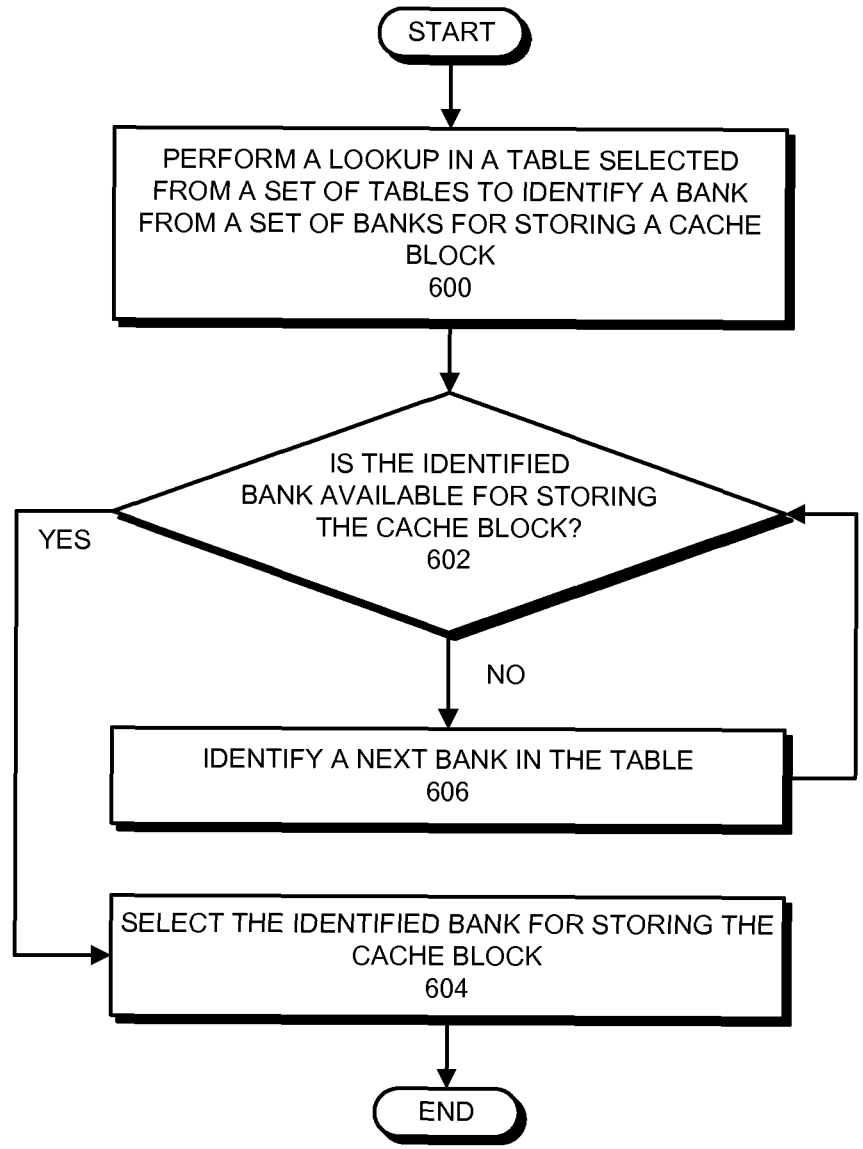
FIG. 6 presents a flowchart illustrating a process for selecting resources in accordance with some embodiments.

FIG. 6 presents a flowchart illustrating a process for selecting resources in accordance with some embodiments. Note that the operations shown in FIG. 6 are presented as a general example of functions performed by some embodiments. The operations performed by other embodiments include different operations and/or operations that are performed in a different order. Additionally, although certain mechanisms are used in describing the process, in some embodiments, other mechanisms can perform the operations.

In the following example, cache 200 is used to describe example operations performed by some embodiments. Recall that cache 200 is a general example of the caches in the memory hierarchy. Thus, any of the L1 caches 116-122, L2 cache 124, and L3 cache 104 can be implemented with similar internal mechanisms to cache 200, and can therefore perform some or all of the example operations in the same way. In addition, in the example, the resource to be selected is a bank in cache 200 (e.g., one of banks 206-212) and the operation to be performed is storing a cache block to the bank. However, in some embodiments, a resource is selected from a different set of resources, and a different operation is performed by the selected resource.

The operation shown in FIG. 6 starts when selection mechanism 216 performs a lookup in a table selected from tables 402 to identify a bank from the set of banks 206-212 in cache 200 for storing a cache block (step 600). During this operation, control circuit 400 in selection mechanism 216 uses information from a store request for the cache block to select the table from tables 402 (e.g., a source of the store request, an address from the request, etc.). For example, in some embodiments, control circuit 400 uses some or all of an address for the cache block for selecting the table. Control circuit 400 then performs a lookup in the selected table to identify the bank from the set of banks, e.g., to particularly identify the bank and a location of the bank in the selected table. In some embodiments, this initially-identified bank is a "home" bank, which is the bank preferentially chosen for storing the cache block. In some embodiments, control circuit 400 uses some or all of the address for the cache block for performing the lookup in the selected table. In some embodiments, a portion of the address that is used for selecting the table from tables 402 is different than the portion of the address used for performing the lookup.

In some embodiments, before performing the lookup in the selected table, control circuit 400 makes one or more adjustments to the selected table. For example, in some embodiments, control circuit 400 includes a limited number of tables that each include permutations of identifiers for the banks in cache 200 (in some embodiments, these are unique permutations). In these embodiments, control circuit 400 can perform a rotation adjustment to configure the table in a desired arrangement. In these embodiments, a table originally arranged as TABLE[2] is above can be rotated as many as 3 places to arrive at three different arrangements: 2130, 0213, 3021, and 1302. In these embodiments, control circuit 400 can include fewer tables than an embodiment where every permutation is separately maintained.

Control circuit 400 then determines if the initially-identified bank is available for storing the cache block (step 602). In this operation, control circuit 400 checks one or more signal lines, data structures, and/or memory elements to determine if the initially-identified bank is indicated as being available to store cache blocks (e.g., powered-up, not busy, not locked, and/or otherwise available). When the initially-identified bank is available, control circuit 400 selects the initially-identified bank for storing the cache block (step 604) and performs the store in the bank.

Otherwise, when the initially-identified bank is not available (step 602), control circuit 400 fails over and begins an operation for using the selected table to identify a failover bank (i.e., a bank to use instead of the initially-identified bank). During the failover operation, until a bank is selected for storing the cache block, control circuit 400 identifies a next bank in the table (step 606) and determines if the identified next bank is available for storing the cache block (step 602). In some embodiments, this operation includes selecting a next location in the table, reading a bank identifier from the next location in the table, and using the bank identifier as the identifier for the next bank in the table. For example, when the above-described TABLE[1] is used and the initially-identified bank is bank 3 (which may be, e.g., bank 210), during the failover operation control circuit 400 may first check bank 2, then bank 1, and, last, bank 0, until an available bank is found. When the identified next bank is available, control circuit 400 selects the identified next bank for storing the cache block (step 604) and performs the store in the next bank. (Note that, as used herein "next bank" means the next bank in a designated order in the selected table during the failover operation, and is not limited to being a particular bank within the selected table.)

As described above, in some embodiments, the operation of selecting the bank from banks 206-212 is one of multiple selection operations (i.e., bank selection operations based on multiple separate cache block store operations), and control circuit 400 is configured to select the table from tables 402 so that the identified next banks (should a failover occur) are balanced among the set of banks with respect to identified next banks for the other selection operations. By selecting the tables across multiple selection operations in this way, control circuit 400 can substantially balance the use of banks in computing device 100 for storing cache blocks in the event of a failover.

In some embodiments, when performing the lookup in a table selected from tables 402, control circuit 400 is configured to read all of the information from the table (e.g., read the entire listing 0123 in TABLE[0], above), and is configured to store the information in a memory element in control circuit 400. If a failover occurs, control circuit 400 is configured to use the stored information to identify the next banks in step 606 without performing another lookup in the selected table.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method, comprising:
by a control circuit in a selection mechanism, selecting a resource from among a set of resources in a computing device by:
selecting a table from a set of tables, each table in the set of tables comprising a listing of resources in the set of resources in a different order;
performing a lookup in the table to acquire information identifying a first resource from a first position in the listing of the resources in the table; and
when the first resource is not available for performing an operation, and until another resource is selected for performing the operation, starting from the first position in the listing of the resources in the table:
identifying a next resource based on the table by acquiring information identifying the next resource from a corresponding next position in the listing of the resources in the table; and
in response to the identifying the next resource based on the table, selecting the next resource for performing the operation when the next resource is available for performing the operation.

2. The method of claim 1, wherein the selecting the table from the set of tables comprises selecting the table so that the operation and one or more additional operations are distributed for performing in a predetermined pattern among the resources in the set of resources.

3. The method of claim 1, wherein the method further comprises:
selecting the first resource for performing the operation when the first resource is available for performing the operation.

4. The method of claim 1, wherein the performing the lookup in the table to acquire the information identifying the first resource comprises:
acquiring the information identifying the next resource when performing the lookup in the table to acquire the information identifying the first resource, so that one lookup is performed for both acquiring the information identifying the first resource and acquiring the information identifying the next resource.

5. The method of claim 1, wherein the method further comprises:
making a rotation adjustment to the table before performing the lookup in the table.

6. The method of claim 1, wherein the method further comprises:
determining a table count to be used when subsequently generating the tables for the set of tables, the table count equal to a number of tables to be generated for the set of tables; and
generating the tables in the set of tables based at least in part on the table count, each table comprising the listing of the resources from the set of resources in the different order.

7. The method of claim 6, wherein the determining the table count is based at least in part on a number of permutations for the listings of the resources.

8. The method of claim 1, wherein the operation to be performed comprises storing a cache block in a cache bank of a cache.

9. An apparatus, comprising:
a processor;
a control circuit in a selection mechanism, the control circuit configured to select a resource from among a set of resources in a computing device by:
selecting a table from a set of tables, each table in the set of tables comprising a listing of resources in the set of resources in a different order;
performing a lookup in the table to acquire information identifying a first resource from a first position in the listing of the resources in the table; and
when the first resource is not available for performing an operation, and until another resource is selected for performing the operation, starting from the first position in the listing of the resources in the table:
identifying a next resource based on the table by acquiring information identifying the next resource from a corresponding next position in the listing of the resources in the table; and
in response to the identifying the next resource based on the table, selecting the next resource for performing the operation when the next resource is available for performing the operation.

10. The apparatus of claim 9, wherein the selecting the table from the set of tables comprises selecting the table so that the operation and one or more additional operations are distributed for performing in a predetermined pattern among the resources in the set of resources.

11. The apparatus of claim 9, wherein the control circuit is further configured to:
   select the first resource for performing the operation when the first resource is available for performing the operation.

12. The apparatus of claim 9, wherein the performing the lookup in the table to acquire the information identifying the first resource comprises:
   acquiring the information identifying the next resource when performing the lookup in the table to acquire the information identifying the first resource, so that one lookup is performed for both acquiring the information identifying the first resource and acquiring the information identifying the next resource.

13. The apparatus of claim 9, wherein the control circuit is further configured to:
   make a rotation adjustment to the table before performing the lookup in the table.

14. The apparatus of claim 9, wherein the control circuit is further configured to:
   determine a table count to be used when subsequently generating the tables for the set of tables, the table count equal to a number of tables to be generated for the set of tables; and
   generate the tables in the set of tables based at least in part on the table count, each table comprising the listing of the resources from the set of resources in the different order.

15. The apparatus of claim 14, wherein the control circuit determines the table count based at least in part on a number of permutations for the listings of the resources.

16. A non-transitory computer-readable storage medium storing instructions that, when executed by a computing device, cause the computing device to perform a method, the method comprising:
   selecting a resource from among a set of resources in a computing device by:
      selecting a table from a set of tables, each table in the set of tables comprising a listing of resources in the set of resources in a different order;
      performing a lookup in the table to acquire information identifying a first resource from a first position in the listing of the resources in the table; and
      when the first resource is not available for performing an operation, and until another resource is selected for performing the operation, starting from the first position in the listing of the resources in the table:
         identifying a next resource based on the table by acquiring information identifying the next resource from a corresponding next position in the listing of the resources in the table; and
         in response to the identifying the next resource based on the table, selecting the next resource for performing the operation when the next resource is available for performing the operation.

17. The non-transitory computer-readable storage medium of claim 16, wherein the selecting the table from the set of tables comprises selecting the table so that the operation and one or more additional operations are distributed for performing in a predetermined pattern among the resources in the set of resources.

18. The non-transitory computer-readable storage medium of claim 16, wherein the method further comprises:
   selecting the first resource for performing the operation when the first resource is available for performing the operation.

19. The non-transitory computer-readable storage medium of claim 16, wherein the method further comprises:
   determining a table count to be used when subsequently generating the tables for the set of tables, the table count equal to a number of tables to be generated for the set of tables; and
   generating the tables in the set of tables based at least in part on the table count, each table comprising a listing of the resources from the set of resources in a different order.

20. The non-transitory computer-readable storage medium of claim 19, wherein the determining the table count is based at least in part on a number of permutations possible for the listings of the resources.

* * * * *